United States Patent
Delerablee et al.

(10) Patent No.: US 9,749,129 B2
(45) Date of Patent: Aug. 29, 2017

(54) METHOD AND SYSTEM FOR CONDITIONAL ACCESS TO A DIGITAL CONTENT, ASSOCIATED TERMINAL AND SUBSCRIBER DEVICE

(75) Inventors: Cécile Delerablee, Paris (FR); Aline Gouget, Paris (FR); Pascal Paillier, Paris (FR)

(73) Assignee: CRYPTOEXPERTS SAS, Paris (FR)

( * ) Notice: Subject to any disclaimer, the term of this patent is extended or adjusted under 35 U.S.C. 154(b) by 444 days.

(21) Appl. No.: 13/988,993

(22) PCT Filed: Nov. 21, 2011

(86) PCT No.: PCT/FR2011/052712
§ 371 (c)(1),
(2), (4) Date: Jul. 31, 2013

(87) PCT Pub. No.: WO2012/069747
PCT Pub. Date: May 31, 2012

(65) Prior Publication Data
US 2013/0308776 A1   Nov. 21, 2013

(30) Foreign Application Priority Data
Nov. 22, 2010 (FR) ..................... 10 59609

(51) Int. Cl.
*H04L 9/00* (2006.01)
*H04L 9/08* (2006.01)
*H04L 9/30* (2006.01)

(52) U.S. Cl.
CPC ............ *H04L 9/0816* (2013.01); *H04L 9/083* (2013.01); *H04L 9/3073* (2013.01); *H04L 2209/60* (2013.01)

(58) Field of Classification Search
CPC ................ H04L 9/22; H04L 9/30; H04L 9/08
USPC .............................. 380/46, 200, 277; 726/27
See application file for complete search history.

(56) References Cited

U.S. PATENT DOCUMENTS

| | | | |
|---|---|---|---|
| 7,302,058 B2* | 11/2007 | Candelore | 380/200 |
| 7,565,546 B2* | 7/2009 | Candelore | 713/182 |
| 2009/0028327 A1* | 1/2009 | Pinder | 380/212 |
| 2009/0138704 A1* | 5/2009 | Delerablee | 713/158 |
| 2009/0323946 A1* | 12/2009 | Wasilewski | 380/200 |

FOREIGN PATENT DOCUMENTS

WO   WO 2007/138204 A1   12/2007

OTHER PUBLICATIONS

International Search Report (PCT/ISA/210) issued on Apr. 4, 2012, by the European Patent Office as the International Searching Authority for International Application No. PCT/FR2011/052712.

(Continued)

*Primary Examiner* — Ali Abyaneh
(74) *Attorney, Agent, or Firm* — Buchanan Ingersoll & Rooney PC

(57) ABSTRACT

A secure method for transmitting a control word between a server and a plurality of processing entities so as to respectively produce and utilize the control word. Preferably such a method is applied to the field of conditional access methods and systems for preventing the fraudulent use of compromised decryption keys resulting from a coalition of pirate hackers.

2 Claims, 2 Drawing Sheets

(56) References Cited

OTHER PUBLICATIONS

Figure 1:
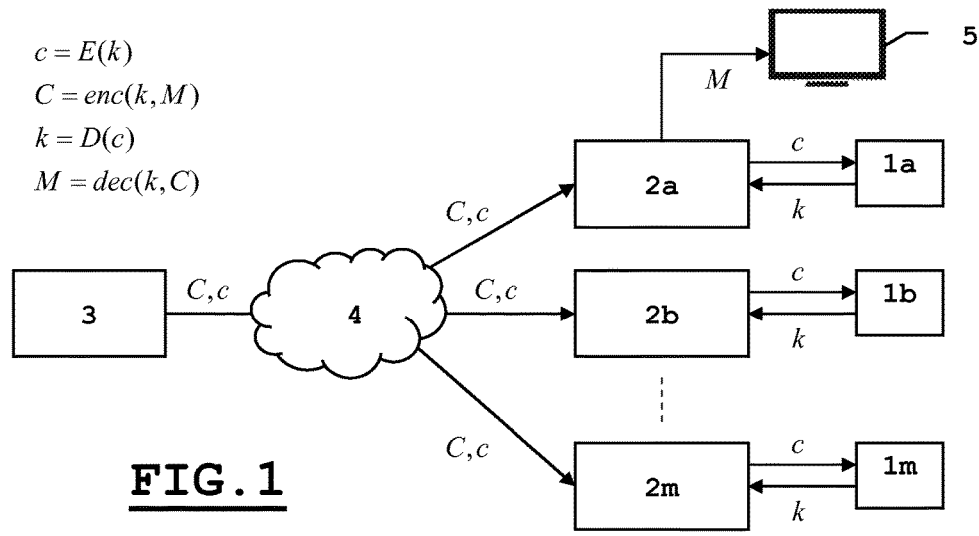

Written Opinion (PCT/ISA/237) issued on Apr. 4, 2012, by the European Patent Office as the International Searching Authority for International Application No. PCT/FR2011/052712.
C. Delerablee et al., "Dynamic Threshold Public-Key Encryption", CRYPTO 2008, Aug. 17, 2008, pp. 317-334, LNCS vol. 5157.
S. Mitsunari et al., "A New Traitor Tracing", IEICE Transactions on Fundamental of Electronics, Feb. 1, 2002, pp. 481-484, vol. E85-A, No. 2.

* cited by examiner

METHOD AND SYSTEM FOR CONDITIONAL ACCESS TO A DIGITAL CONTENT, ASSOCIATED TERMINAL AND SUBSCRIBER DEVICE

The invention relates to a secure system and method for transmitting, between a server and a plurality of entities, a ciphertext whose decryption is operated by such entities. The invention is a preferred, application in the field of systems and methods for conditional access to digital content to prevent fraudulent use of one or more decryption keys. The invention is particularly effective and manageable for operators to prevent piracy in the case where several unscrupulous users form a coalition to generate decryption data from which it is difficult to distinguish which decryption key(s) were used to produce said decryption data. The invention thus provides effective protection against the fraudulent supply of protected multimedia content while preserving the computing capabilities necessary for its implementation and the bandwidth of the protected content distribution networks.

The invention further relates to a method for triggering the temporary or permanent revocation of the electronic equipment made available to a subscriber or the possible restoration of the latter. The invention thus relates to the adaptations of said material—such as terminals optionally coupled to secure electronic devices—and to protected content distribution servers to allow the implementation of a method for robust and efficient conditional access.

A broadcast operator of digital content generally operates a Conditional Access System (CAS) to make a protected content available to a subscriber or a plurality of subscribers. Such a system generally relies on secure electronic devices, such as smart cards, to host the identities and/or the rights of subscribers and to perform operations of encryption, decryption, or number generating.

In the known conditional access systems, in order to distribute protected multimedia, content, encrypted control words c and encoded contents C are transmitted through a broadcast network, at regular intervals or crypto-periods, at least, known and controlled by the broadcast operator. An encrypted control word is generally obtained by means of an encryption function E such that $c=E(k)$, k being the value or said control word. An encoded content C is itself obtained by a coding function enc and said control word k, such that $C=enc(k,M)$, M being the multimedia content. By way of example, the encoding function may conform to the DVB-CSA (Digital Video Broadcasting-Common Scrambling Algorithm) norm. To be allowed to view or listen to protected content, a person must purchase a subscription, A subscriber receives a secure and dedicated device, usually in the form of a smart card, which, coupled with a terminal commonly called decoder or "set-top box", represents a subscriber processing entity that allows said subscriber to decode a protected, content. The encrypted control words c are typically decrypted by the secure device which supplies the control words k to the terminal. The latter is responsible for carrying out the decoding of encoded content C and allows, through a Man-Machine interface adapted—for example, a living room television—accessing the content M.

Although the robustness of subscriber devices is particularly well known, knowledge of cryptographic hardware, algorithms or secrets have allowed hackers to "break" the security of secure electronic devices provided to subscribers. A hacker can then "clone" or emulate such a device and make some "reproductions" available to unscrupulous subscribers without the need to operate a pirate network to supply control words or contents.

To counter the hackers, operators usually come to know the existence of such a pirate network or the marketing of data decryption reproductions. By soliciting the services of a hacker, an operator can even obtain a "cloned" or emulated device and study it.

An operator, or more generally any "tracing" entity seeking to unmask subscriber secure devices whose safety has been compromised, encounters real difficulty in tracing the source of piracy. This is particularly true when the fraudulent decryption data which he has are the result of a collusion of several distinct decryption keys. Indeed, according to known techniques, decryption keys are little or not traceable or detectable by analyzing such decryption data. The investigation is all the more delicate when the collusion is extended. To try and circumvent this problem, some operators or tracers have significantly increased the size of the decryption keys of the control words as well as the ciphertexts of the latter. In known solutions, said sizes are directly related and increase linearly with respect to the total number of subscribers or to a bound on that number. Some known, techniques, such as the ones described for example in document US2008/0075287A1, manage at most to reduce these sizes in the order of the square root of the number of subscribers. Other techniques, such as the ones disclosed in document WO2007/138204, require a size of ciphertexts of the same order as the size of an eligible collusion. The ability of a tracer to detect a fraudulent decryption key has improved at the expense of the bandwidth of the broadcast networks and of the computing capacity of secure subscriber devices to produce, by crypto-period, control words whose ciphertext size is substantial. In addition, such solutions remain very penalizing and almost inoperable when the number of subscribers is large.

There are therefore no known methods allowing tracing and identifying one or more lawfully distributed decryption keys using decryption data resulting from collusions while preserving a realistic bandwidth and computing capacity to operate a protected content distribution service.

Among the many advantages provided by the invention, we can mention that the invention helps fight against the distribution of information to illegitimate users allowing a fraudulent decryption of protected, content broadcast to users, who, for example, contracted a paid subscription. Indeed, the invention allows effectively tracing and distinguishing a secret and dedicated decryption key used to develop such information. According to various embodiments, the invention allows dissociating the size of secret decryption keys of control words or their ciphertexts, the number of subscribers and/or eligible collusions. It provides operators with a highly effective and potentially dynamic compromise for dimensioning said sizes to preserve the bandwidth of the distribution network and the computing capacity of subscriber processing entities while tolerating a large number of possible collusions. The invention also allows remotely revoking a subscriber processing entity whose security may nave been broken, known as "treacherous entity," while continuing to broadcast content through the broadcast network. The invention thus provides any content broadcasting operator a particularly simple and effective tool in the fight against piracy.

To this end, a secure method for transmitting a control word between a server and a plurality of processing entities is particularly planned to respectively generate and operate said control word.

Such a method comprises a first step for generating by the server an encrypted control word c whose plaintext k is intended to be used by the processing entity. It also includes a step for transmitting the encrypted control word c generated for the processing entities, as well as a step for receiving the encrypted control word c by those entities and producing a control word k from the encrypted control word c received.

To provide an "efficiency vs. resistance" compromise to treacherous key collusions, the invention provides that:

the server generates the encrypted, control word from:
- a vector s of $d_s$ elements each belonging to the set $\mathbb{Z}_p^*$ of non-zero integers modulo p, p being a prime number, $d_s$ being an integer strictly greater than 1 and small compared to the number of processing entities;
- a secret value γ known by the server and belonging to the set $\mathbb{Z}_p^*$ of non-zero integers modulo p;
- two generators belonging respectively to two cyclic groups $\mathbb{G}_1$ and $\mathbb{G}_2$ of order p, parameters of a bilinear group $\beta=(p,\mathbb{G}_1,\mathbb{G}_2,\mathbb{G}_T, e(.,.))$ of order p where e(.,.) is a coupling such that e: $\mathbb{G}_1 \times \mathbb{G}_2 \rightarrow \mathbb{G}_T$, $\mathbb{G}_T$ being a third cyclic group of order p;

each processing entity generates a control word k from:
- the encrypted control word c;
- a decryption key $DK_i$ known to the $i^{th}$ entity and previously generated from:
  i. a vector $x^{(i)}$ of $d_x$ elements each belonging to the set $\mathbb{Z}_p^*$ of non-zero integers modulo p, $d_x$ being an integer strictly greater than 1 and small compared to the number of processing entities, the vector $x^{(i)}$ being dedicated to the entity concerned;
  ii. the secret value γ;
  iii. a generator belonging to one of the cyclic groups of the bilinear group β.

According to a preferred embodiment, such a method may comprise beforehand:
- a step for developing a master secret key MK comprising the secret component γ associated with public parameters among which the bilinear group β;
- a step for storing said key MK and public parameters within the server;
- a step for storing said public parameters within each processing entity;
- a step for generating, transmitting and storing the decryption keys $DK_i$, respectively dedicated and distinct, within the processing entities.

The invention provides that each decryption key $DK_i$ generated can advantageously comprise a component of form $$z^{\frac{1}{P(\gamma)}},$$

z being a generator belonging to one of the cyclic groups of the linear group β and P being a polynomial in γ.

According to a preferred embodiment, the invention also relates to a method for conditional access to digital content including:
- a step for encoding a digital content M and generating an encoded content C using an encoding function implemented by a broadcast server of protected digital contents;
- a step for generating by said, broadcast server of protected digital contents an encrypted control word c whose plaintext k is intended for use by a plurality of subscriber processing entities for decoding said, encoded content C;
- a step for transmitting through a distribution network and to the subscriber processing entities, said encrypted content C and encrypted control word c;
- a step for receiving by each subscriber processing entity said encrypted content C and encrypted control word c;
- a step for generating the plaintext of a control word k by each subscriber processing entity from the ciphertext c;
- a step for decoding by each subscriber processing entity the encoded content C and generating a content M from a decoding function and k;
- a step for retrieving said content M by means of an interface suited to said content.

The steps for generating and transmitting an encrypted control word by the broadcast server of protected digital contents, as well as the steps for receiving and generating the plaintext of a control word by the subscriber processing entities, comply with the secure method for transmitting a control word between a server and a plurality of processing entities in accordance with the invention.

The invention further relates to a system for conditional access to digital content comprising a server connected to a plurality of subscriber processing entities to implement a conditional access method, according to the invention.

Figure 2:
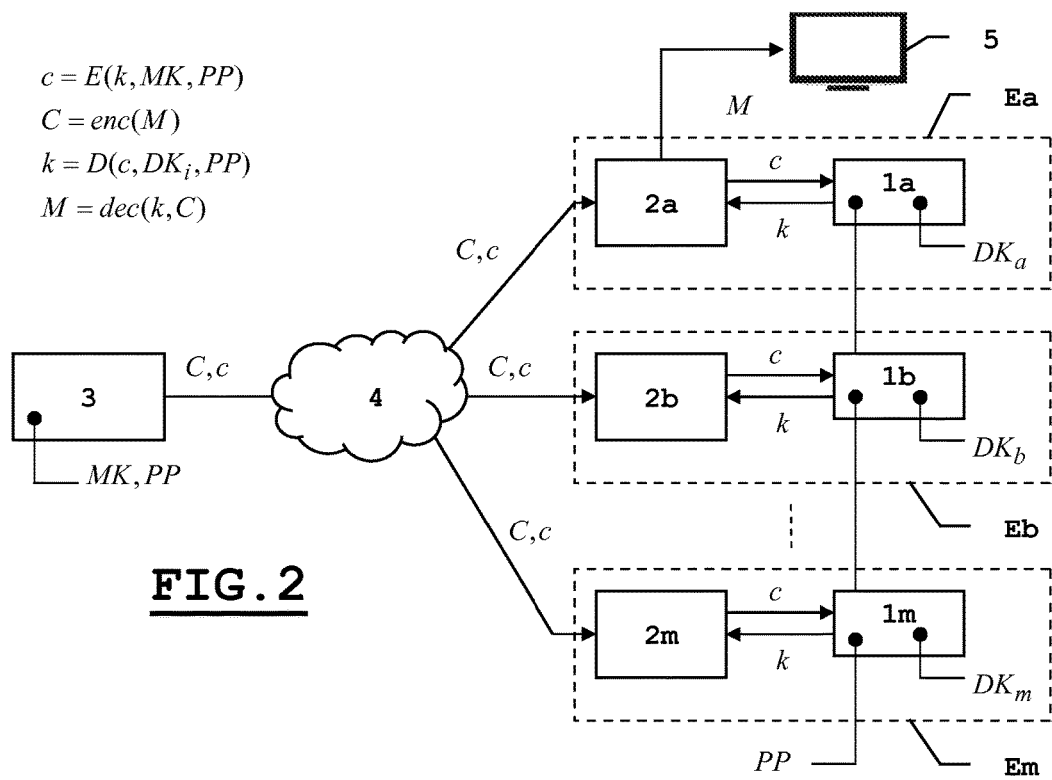
Figure 3:
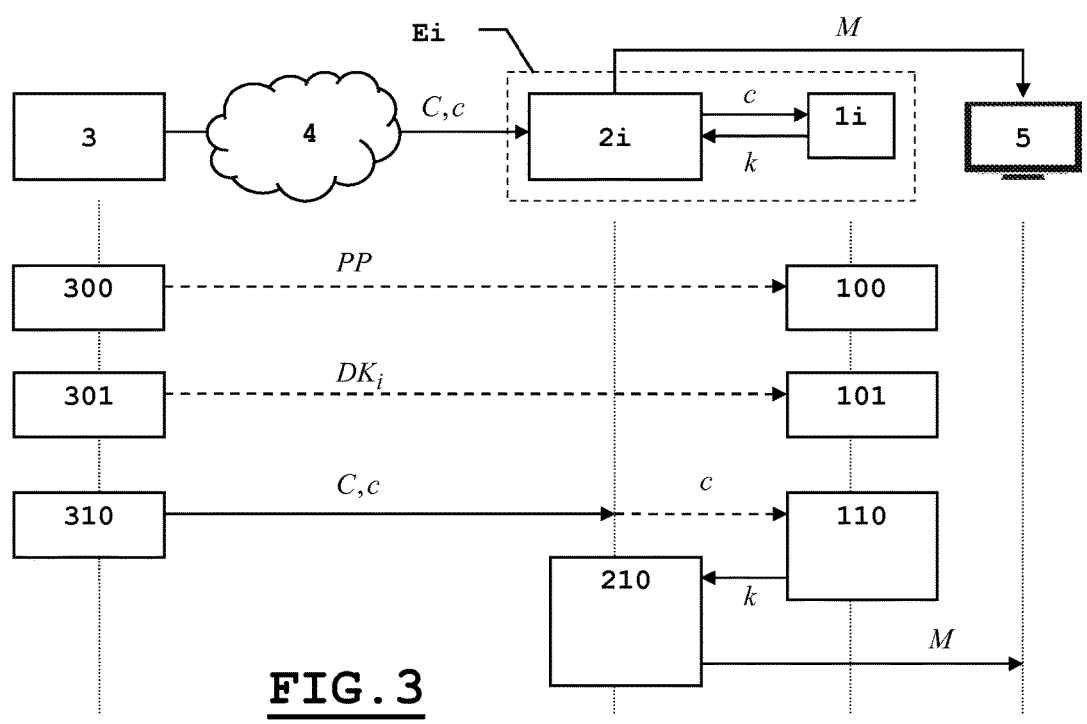

Other features and advantages will become more apparent upon reading the following description and examining the accompanying figures, among which:

FIG. 1 shows a conditional access system according to the prior art;

FIG. 2 describes a conditional access system according to the invention;

FIG. 3 depicts an embodiment of a conditional access method according to the invention.

FIG. 1 shows a conditional access system to digital content according to the prior art. It consists of a broadcast network 4 implemented by a protected content broadcast operator. Thus, control words c and contents C, respectively encrypted, and encoded, are issued jointly from a content server 3. For that purpose, server 3 encodes a content M using an encoding function enc and a control word k, the latter being generated by said server 3. The result is an encoded content C such that C=enc(k,M). An encrypted version c of control word k is also issued or "broadcast" together with the encoded content C. For that purpose, the server encrypts said control word k using an encryption function E to obtain c such that c=E(k).

The encrypted control words c and encrypted, contents C are transmitted via the broadcast network 4 to terminals 2a to 2m. These are responsible respectively for decoding in real time the encoded, contents C issued by server 3. Thus a terminal—such as, for example, the decoder 2a—implements a decoding function dec and applies it to the encoded content C to obtain the content M. The latter can be viewed using a living room television 5 or any other interface suited, to retrieve the content. To apply the decoding function dec, a terminal must know the value of control word k that was used by server 3 to encode content M. According to the prior art, and as shown in FIG. 1, a terminal 2a to 2m receives an encrypted, control word c such that c=E(k) and sends it to a secure electronic device 1a to 1m, usually dedicated to a subscriber. Terminal 2a regularly receives, through network 4, couples (C,c) and transmits encrypted control words c to a device 1a. Device 1a can decrypt an encrypted control word c using a decryption function D to obtain the control word k used to encode content M. Thus k=D(c). The same applies to any other device, such as 2b to 2m, each respectively cooperating with a device 1b to 1m. According to a variant embodiment, server 3 can use a secret, for example in the form of a key Kc to encrypt a control word k. Thus c=E(Kc,k). In this case, a device, such as device 1a to 1m, implements a reciprocal decryption function D, such that k=D(Kd,c) where Kd is a decryption key known by the device. According to the encryption function E and decryption function D, keys Kc and Kd can be identical. This is the case for a symmetrical encrypt ion/decryption. Alternatively, according to a pattern called "broadcast encryption" Kc is a public or secret key dedicated to the operator and Kd is a secret key dedicated to the device (or, alternatively, to a group of devices) and known to the operator. According to this variant, there are therefore several individual decryption keys and each of the devices lawfully issued and delivered to the subscribers of said operator has such a personal decryption key.

To jeopardize such a conditional access system, hackers have developed their knowledge of cryptographic hardware, algorithms or secrets implemented in particular by the subscriber devices. Some know—or could—"break" the security of such subscriber electronic devices and be able to read the value of one or more decryption keys used to generate valid control words to ultimately decode encrypted messages. All it takes then, is to fraudulently put these keys—which we call "treacherous keys"—on a parallel market for unscrupulous users to integrate a treacherous key in a hacked terminal and thus benefit from unauthorized access to protected content. This type of criminal act can be greatly facilitated when a broadcast operator operates a conditional access system for which the content decoding function and decrypt ion function of encrypted control words are performed by a single and same processing entity made available to a subscriber. Thus, such an entity does not necessarily include security features to protect the means for storing the decryption keys and/or algorithms and methods used to generate the control words. Leaks resulting from, the insufficiently secure implementation of such algorithms allow revealing the decryption key manipulated, etc.

A hacker can thus provide certain "reproductions" of decryption keys to unscrupulous customers without necessarily operating a pirate network to distribute the control words or contents.

To try to counter such activities, it is useful to be able to trace or detect the "treacherous" or compromised decryption key which is the source of the reproduction. Such a key must therefore be traceable, that is to say, have a marker or a component that is dedicated to a subscriber. Thus, when in possession of a hacked terminal or the software implemented by the hacker, it is possible for a tracer to use certain methods of analysis to detect the secret data that was manipulated. The tracer's task becomes complicated when several treacherous keys are combined by a hacker or by a coalition of hackers.

The invention makes it possible to defeat these different hacking scenarios.

FIG. 2 helps to illustrate a conditional access system as an example of preferred embodiment of the invention. As with a known system, the invention provides a broadcast network 4 implemented by a protected content broadcast operator—or, more generally, any means—to transmit, from a content server 3, encoded contents C destined for a plurality of subscriber processing entities such as Ea, Eb, . . . Em entities. The invention further provides that the encoded contents C are emitted in conjunction with encrypted control words c whose plaintexts allow decoding said encoded contents by each subscriber entity. To do this, server 3 encodes a content M using an encoding function enc. The result is an encoded content C such that C=enc(M).

The security of such a system essentially lies in the fact that the control words can be generated, exchanged, and used securely by the server and the plurality of subscriber processing entities. Such control words could just as well be used in a different application context of a conditional access system to protected digital content.

The invention is based on the mathematical concept of coupling in first-order groups, a concept exploited in many publications including documents US2008/0075287A1 or WO2007/138204 mentioned above. Such coupling is a bilinear application typically used in cryptography, particularly in the field of elliptic curves.

Let $\beta$ be a bilinear group $\beta=(p, \mathbb{G}_1, \mathbb{G}_2, \mathbb{G}_T, e(.,.))$ of first order p such that $|p|=\lambda$, $\lambda$ defining the size of elements as a security parameter. $\mathbb{G}_1$, $\mathbb{G}_2$ and $\mathbb{G}_T$ are three cyclic groups of order p and e: $\mathbb{G}_1 \times \mathbb{G}_2 \rightarrow \mathbb{G}_T$ is a coupling. A cyclic group is an algebraic set such that $g^{p+1}$ is equal to g, p defining the order of the cyclic group and g being an element of the group that is called "generator". Within the meaning of the invention, a special relationship between groups $\mathbb{G}_1$ and $\mathbb{G}_2$ is not required. The two groups may be the same or, more generally, an isomorphism $\Psi$ between $\mathbb{G}_1$ and $\mathbb{G}_2$ can be defined. The invention provides that any possible, effectively computable, isomorphism and coupling be preferred.

According to a preferred embodiment, a processing entity Ei consists of a terminal 2i coupled to a secure device 1i, e.g. a smart, card, to respectively perform the decoding of an encoded content and the generating of control words required for said decoding. FIG. 2 shows the entities Ea, Eb and Em as resulting respectively from terminal 2a, 2b, 2m coupled to a secure subscriber device 1a, 1b, 1m.

Within the meaning of the invention, such an entity could be one and the same device that would encompass the two main functions previously described.

A secret and dedicated decryption key is known to each subscriber device (or subscriber entity). Thus, according to FIG. 2, device 1a of entity Ea associated with subscriber a, knows the decryption key $DK_a$. This key is distinct from key $DK_b$, itself distinct from key $DK_m$. These keys are only known respectively to entities Eb and Em (or, more precisely, to respective secure subscriber devices 1b and 1m). Although dedicated, and distinct, the decryption keys according to the invention are traceable (that is to say, identifiable in an action of discrimination or tracing, as discussed below). They are all generated from a master secret key MK known to server 3, said key being possibly associated with public parameters P—including bilinear group $\beta$—parameters known to said server, but also to the different processing entities, specifically, according to the preferred example described in connection with FIG. 2, known to devices 1a to 1m.

Decryption keys allow processing entities Ea to Em to generate a control word k which allows decoding the encoded contents. This control word k is generated from an encrypted control word c issued jointly with the encoded content C by server 3. According to the preferred example described in connection with FIG. 2, the secure devices 1a to 1m are responsible for generating the control word k within each processing entity Ea to Em. For this purpose, terminals 2a to 2m are able to receive the encrypted control words c and are also able to transmit said encrypted words c to the respective secure device. The control words generated by devices 1a to Am are transmitted, back to the respective terminals so that they can decode the encoded contents C and thereby in turn produce a content M returned by a man-machine interface adapted 5 to a subscriber.

FIG. 3 is used to describe an example of application of the invention in the form of a conditional access method to protected content implemented by a system such as that described in connection with FIG. 2. By way of simplification, the plurality of processing entities is represented by entity Ei as terminal 2$i$ associated with a secure subscriber device 1$i$. Encoded contents C are transmitted from, server 3 to entity Ei via a network 4. Any other broadcasting means could, be used for this purpose. The encoded contents are associated with encrypted control words c whose plaintexts allow decoding the encoded contents. Terminal 2$i$ is able to receive the encoded contents and the encrypted control words. The latter are transmitted by the terminal to the subscriber device which, using the secret decryption key DK$_i$ and the public parameters PP, generates the control words and transmits them back to the terminal 2$i$. This terminal can decode the encoded contents C using the control word k and deliver the contents M to the interface 5. In order to achieve this, a conditional access method according to the invention consists of the main steps 310, 110 and 210, corresponding respectively to:

310: producing and issuing encoded content C associated with encrypted control words c to processing entities;

110: producing control words k from the encrypted control words c and the decryption key DK$_i$;

210: decoding the encoded contents from the control words k.

Optionally, these steps may be preceded by steps 300 and 100 which consist in generating public parameters PP and saving them in the processing entities Ei, specifically the secure devices. FIG. 3 also describes the preliminary steps 301 and 101 of generating the decryption keys DK$_i$ and storing them in processing entities Ei, specifically in devices 1$i$.

Beyond the preferred example applied to the conditional access method, and system, the invention relates primarily to a secure method for transmitting a control word between a server and a plurality of processing entities to respectively produce and exploit said control word.

Let us examine through two embodiments how to implement such a method—applied to the application example described in connection with FIG. 3.

Let β be a bilinear group β=(p,$\mathbb{G}_1$,$\mathbb{G}_2$,$\mathbb{G}_T$,e(.,.)) of first order p such that |p|=λ, λ defining the size of elements as a security parameter. $\mathbb{G}_1$, $\mathbb{G}_2$ and $\mathbb{G}_T$ are three cyclic groups of order p and e: $\mathbb{G}_1 \times \mathbb{G}_2 \rightarrow \mathbb{G}_T$ is a coupling.

A method according to the invention comprises:

a step 310 for generating by a server an encrypted control word c whose plaintext k is intended to be used 210 by the processing entity;

a step for transmitting the encrypted control word c generated to the processing entities;

a step for receiving the encrypted control word c by said entities;

a step for generating 110 a control word k by each processing entity from the encrypted control word c received.

To maintain the traceability of the decryption keys DK$_i$ while allowing high efficiency (in terms of bandwidth and processing power), step 310 for generating the encrypted version of a control word is performed by server 3 from:

a vector s of d$_s$ elements each belonging to the set $\mathbb{Z}_p^*$ of non-zero integers modulo p, p being a prime number, d$_s$ being an integer strictly greater than 1 and small in terms of the number of processing entities;

a secret value γ known to server 3 and belonging to the set $\mathbb{Z}_p^*$ of non-zero integers modulo p;

two generators belonging respectively to cyclic groups $\mathbb{G}_1$ and $\mathbb{G}_2$, parameters of bilinear group β=(p,$\mathbb{G}_1$, $\mathbb{G}_2$,$\mathbb{G}_T$,e(.,.)).

Each processing entity Ei generates 110 a control word k from:

the encrypted control word c;

a decryption key DK$_i$ known to the entity Ei and previously generated from:

a vector x$^{(i)}$ of d$_x$ elements each belonging to the set $\mathbb{Z}_p^*$ of non-zero integers modulo p, d$_x$ being an integer strictly greater than 1 and small in terms of the number of processing entities, the vector x$^{(i)}$ being dedicated to the concerned entity;

the secret value γ;

a generator belonging to one of the cyclic groups of the bilinear group β.

The invention provides that the integer values of d$_x$ and of d$_s$ be small in terms of a number of entities and therefore ultimately in terms of the number of subscribers or hackers.

These two integers are security parameters used to determine and adjust the compromise "efficiency vs. resistance" depending on the dishonest collusions. The parameter d$_x$ is used to scale the size of a decryption key according to the invention. The parameter d$_s$ is used directly to scale the size of encrypted control words.

Therefore, d$_s$ has a direct impact on the bandwidth of the broadcast network of encrypted control words. d$_x$ (just as d$_s$) has itself a direct impact on the processing capabilities of the entity (or the secure device) that must store and handle the decryption keys to produce the plaintexts of the control words from their ciphertexts.

Unlike known solutions for which the sizes of keys and encrypted versions grow linearly with the size of the collusions or with the square root of the number of subscribers or groups of subscribers, the invention allows maintaining particularly advantageous sizes and without comparison with known solutions. So, if we consider that there is a risk t of coalitions, then a process according to the invention will help define d$_x$ and d$_s$ such that $$t = C_{d_x+d_s-1}^{d_x} = \frac{(d_x + d_s - 1)!}{d_x!(d_s - 1)!}.$$

By way of examples, the invention allows obtaining (depending on the embodiment) the following compromises:

for t=120: d$_x$=3 et d$_s$=7;

for t=126: d$_x$=4 et d$_s$=5;

for t=105: d$_x$=2 et d$_s$=13.

These results allow emphasizing the particularly significant contribution of the invention compared to of the prior art.

As shown in FIG. 3, a method, for securely transmitting a control word between a server and a plurality of processing entities, according to the invention, may comprise a step 300 to develop and store a master secret key MK comprising the secret component γ associated with public parameters, such as the bilinear group β. It may also include a step 100 to store said public parameters within each processing entity—more specifically and preferably—within, the secure subscriber device of said entity. Upon purchasing a subscription, for example, in order to be able to deliver material to a subscriber knowing the secret and dedicated decryption key DK$_i$, such a method may also include a step to produce 301, transmit and record 101 the decryption key $DK_i$ within the processing entity—more specifically and preferably—within the subscriber secure device of said entity.

We will successively describe two embodiments of such a method. These two embodiments have particularly in common that the decryption key $DK_i$ generated has a component of the form $$z^{\frac{1}{P(\gamma)}},$$

z being a generator belonging to one of the cyclic groups and the bilinear group $\beta$ and P being a polynomial in $\gamma$.

According to a first embodiment, for a bilinear group $\beta=(p,\mathbb{G}_1,\mathbb{G}_2,\mathbb{G}_T,e(.,.))$ and the security parameters $d_x$ and $d_s$ selected, the master secret key MK consists of $\gamma$ and g, such that $MK=(\gamma,g)$. $\gamma$ is a secret value belonging to the set $\mathbb{Z}_p^*$ of non-zero integers first modulo p. g is a generator of the group $\mathbb{G}_1$. The value of g can advantageously be randomly selected. Similarly, a generator h of the group $\mathbb{G}_2$ is possibly randomly selected. Advantageously, $v=e(g,h)$ can be calculated and value v can be associated with the components $\gamma$ and g of key MK.

To constitute the public parameters, $g^\gamma$, $g^{\gamma^2}$, ..., $$g^{\gamma^{d_s-1}},$$

$h^\gamma$, ..., $$h^{\gamma^{d_x-1}}$$

are calculated. In addition to $\beta$ and h, all these values represent the public parameters.

All these calculations or random selections can be performed by the server 3 or be performed and obtained from a separate and dedicated server for this purpose.

According to this first embodiment, the step to generate a decryption key consists in generating said key as a result of two components, such as $DK_i=(x^{(i)},A_i)$ where $$A_i = g^{\frac{1}{P(\gamma)}}$$

with $P(\gamma)=(\gamma+x_1^{(i)})\cdot(\gamma+x_2^{(i)})\ldots(\gamma+x_{d_x}^{(i)})$. Thus, upon the subscription of a new user or subscriber i, the unique and dedicated key $DK_i$ is generated then transmitted and recorded—preferably securely—in the processing entity Ei which will exploit said key to generate the control words. More specifically, such a key is stored in a secure device 1i component of the entity Ei.

To produce an encrypted control word, the server 3 generates said word as the result of two components such as $$c = \left(s, h^{\frac{1}{Q(\gamma)}}\right)$$

with $Q(\gamma)=(\gamma+s_1)\cdot(\gamma+s_2)\ldots(\gamma+s_{d_s})$, s being a vector of the elements $d_s$ of $\mathbb{Z}_p^*$. Vector s can be written as $s=(s_1, s_2, \ldots, s_{d_s})$.

Upon receiving an encrypted control word c, a processing entity Ei implements a step to produce the plaintext of the control word. This step aims to retrieve a control word k whose value should be $$k = e(g, h)^{\frac{1}{\gamma+s}}.$$

This step consists in generating k such that $$k = e\left(g^\alpha, h^{\frac{1}{Q(\gamma)}}\right) \cdot e(A_i, h^\xi) \cdot e\left(A_i, h^{\frac{1}{Q(\gamma)}}\right)^\theta.$$

The computing elements $\alpha$, $\xi$ and $\theta$ are such that:

$$\alpha = 1 - \theta\left(\frac{1}{P}[Q](\gamma)\right), \xi = -\theta\left(\frac{1}{Q}[P](\gamma)\right) \text{ and}$$

$$\theta = \frac{1}{\left(\frac{1}{P}[Q]\right)^0}, \frac{1}{P}[Q]$$

being the notation to designate the opposite of the polynomial P modulo, the polynomial Q and $$\left(\frac{1}{P}[Q]\right)^0$$

designating the term of 0 degree of the polynomial $$\frac{1}{P}[Q].$$

We can see that $\theta$ is a constant computable from the coefficients of P and Q, and that the values $\xi$ and $\alpha$ (which are polynomials in $\gamma$) are not required in the calculation to produce the plaintext of the control word. Indeed, combinations of successive powers of $g^\gamma$ and $h^\gamma$ contained in the public parameters) are used to reconstruct the desired polynomials in exponents of g and h and thereby to obtain $g^\alpha$ and $h^\xi$ which allows generating the plaintext of the control word.

The elements $\alpha$, $\xi$ and $\theta$ can also be described as follows:

$$\alpha = 1 - \frac{\sum_{l=1}^{d_s}\frac{Q_l(\gamma)}{R_l(-s_l)}}{\sum_{l=1}^{d_s}\frac{\prod_{j\neq l}s_j}{R_l(-s_l)}}, \xi = -\frac{\sum_{l=1}^{d_x}\frac{P_l(\gamma)}{R_{l+d_s}(-s_l)}}{\sum_{l=1}^{d_s}\frac{\prod_{j\neq l}s_j}{R_l(-s_l)}} \text{ and}$$

$$\theta = \frac{1}{\sum_{l=1}^{d_s}\frac{\prod_{j\neq l}s_j}{R_l(-s_l)}}$$

with:

$$Q_l(\gamma) = \prod_{\substack{j=1 \\ j \neq l}}^{d_s} (s_j + \gamma), \ P_l(\gamma) = \prod_{\substack{q=1 \\ q \neq l}}^{d_x} (x_q^{(i)} + \gamma), \ R_l(\gamma) = \prod_{\substack{j=1 \\ j \neq l}}^{d_s+d_x} (s_j + \gamma)$$

and $s_{d_s+m} = x_m^{(i)}$ for m=1, . . . , $d_x$.

In this first, embodiment, the size of the decryption key $DK_i$ is linear in $d_x$. As for the size of the ciphertext, it is linear in $d_s$.

In a variant of this first embodiment, it is possible to reduce the size of the ciphertexts c and the secret decryption keys $DK_i$. Indeed, first of all, the vector $x^{(i)}=(x_1^{(i)}, \ldots, x_{d_x}^{(i)})$ may be generated during the production of a key $DK_i$ by server 3 from a seed $\mu_i$. This seed is then a component of the secret key such that $DK_i=(\mu_i, A_i)$. Reciprocally, the vector $x^{(i)}$ can be recovered by the processing entity using said seed during decryption of the control word. Furthermore, the vector $s=(s_1, \ldots, s_{d_s})$ may be generated during the production of a ciphertext c by server 3, from a seed $\eta$. This seed is then a component of the ciphertext such that $$c = \left(\eta, h^{\frac{1}{Q(\gamma)}}\right).$$

Reciprocally, the vector s can be recovered by the processing entity using said seed $\eta$ during the decryption of the control word.

In this variant, the sizes of the decryption key $DK_i$ and of the ciphertext become constant.

In a second embodiment, for a bilinear group $\beta=(p, \mathbb{G}_1, \mathbb{G}_2, \mathbb{G}_T, e(.,.))$ and the security parameters $d_x$ and $d_s$ selected, the master secret key MK consists of $\gamma$ and g, such that $MK=(\gamma, g)$. $\gamma$ is a secret value belonging to the set $\mathbb{Z}_p^*$ of non-zero integers first modulo p. g is a generator of the group $\mathbb{G}_1$. The value of g can advantageously be randomly selected. Similarly, we choose, possibly randomly, a generator h of the group $\mathbb{G}_2$. Advantageously, we can calculate $v=e(g,h)$ and associate value v with components $\gamma$ and g of key MK.

Public parameters are $\beta$.

All these calculations or random selections can be performed by server 3, or be performed and obtained from a separate server dedicated to this purpose.

According to this second embodiment, the step for generating a decryption key consists in generating said key as a result of two components such that $DK_i=(A_i, B^{(i)})$ where $$A_i = g^{\sum_{j=1}^{d_x} \frac{x_j^{(i)}}{\gamma + x_j^{(i)}}}$$

and vector $B^{(i)}$ of elements $d_x$ such that:

$$B^{(i)} = (B_1^{(i)}, x_1^{(i)}), (B_2^{(i)}, x_2^{(i)}), \ldots, (B_{d_x}^{(i)}, x_{d_x}^{(i)}) = \left(h^{\frac{1}{\gamma+x_1^{(i)}}}, x_1^{(i)}\right),$$

$$\left(h^{\frac{1}{\gamma+x_2^{(i)}}}, x_2^{(i)}\right), \ldots, \left(h^{\frac{1}{\gamma+x_{d_x}^{(i)}}}, x_{d_x}^{(i)}\right)$$

Thus, upon the subscription of a new user or subscriber i, the unique and dedicated key $DK_i$ is generated then transmitted and stored—preferably securely—in the processing entity Ei which will use said key to generate the control words. More specifically, such a key is stored in a secure device 1i component of the entity Ei.

To generate an encrypted, control word, server 3 generates the encrypted control word as the result of four components such as $c=(W_1, W_2, s, U)$ with $U=(U_1, \ldots, U_{d_s})$ vector of $d_s$ values. The vector U is such that $$U_1 = h^{\frac{1}{\gamma+s_1}}, \ U_2 = h^{\frac{1}{(\gamma+s_1)(\gamma+s_2)}}, \ldots, U_{d_s} = h^{\frac{1}{(\gamma+s_1) \cdots (\gamma+s_{d_s})}}.$$

Components $W_1=(g^\gamma)^m$, $$W_2 = h^{\frac{m}{(\gamma+s_1) \cdots (\gamma+s_{d_s})}} = U_{d_s}^m$$

being an integer.

Upon, receiving an encrypted control word, c, a processing entity Ei implements a step to generate the plaintext of said control word. The purpose of this step is to retrieve a control word k whose value should be $$k = e(g, h)^{\frac{m \cdot d_x}{\prod_{j=1}^{d_x}(\gamma+s_j)}},$$

m being the integer previously selected.
This step consists in calculating k such that $$k = e\left(g^\gamma, \prod_{j=1}^{d_x}(B_j^{(1)})^{\frac{1}{\prod_{l=1}^{d_s}(\gamma+s_l)}}\right) \cdot e(A_i, W_2) \text{ where } \prod_{j=1}^{d_x}(B_j^{(i)})^{\frac{1}{\prod_{l=1}^{d_s}(\gamma+s_l)}} =$$

$$\prod_{j=1}^{d_x}\left(B_j^{(i)} \cdot \prod_{y=1}^{d_s} U_y^{(-1)^{i+d_s} \cdot \prod_{n=1}^{y-1}(x_j^{(i)}-s_n)}\right)^{\frac{1}{\prod_{l=1}^{d_s}(x_j^{(i)}-s_l)}}$$

According to this second embodiment, the size of the decryption key $DK_i$ is linear in $d_x$. The size of the ciphertext is itself linear in $d_s$.

A particularly advantageous choice may be to determine $d_s$ and $d_x$ such that the number of collusions t is exponential in $(d_x+d_s)$.

Whether in the first or second embodiment, it is particularly advantageous that the component $A_i$ of key $DK_i$ be stored by means of secure storage in each processing unit. This is particularly relevant when a processing unit comprises a secure device. It suffices, in this case—to ensure the robustness of the system—that said, component $A_i$ be at least stored in it or, alternatively, the entire key $DK_i$. Storing only the component $A_i$ can reduce the safe storage capacity necessary for the robustness of the system.

As an example, and to illustrate the ability of a tracer to detect a decryption key, we are now presenting a method, for tracing. To describe this method, we will use a notation such as $\langle U, V \rangle$ to describe such a coupling (or pairing) equivalent to the notation e(U,V) previously used. Let us consider that the tracer was able to recover a pirate decoder. The analysis of the latter allows him to get the pirate software and to implement a white-box type tracing method.

In a first step, the pirate decoder is interpreted as a sequence of formal instructions. Each instruction consists of a reference operation, one or more input variables and one output variable. Conventionally, the operations known as reference operations are listed in a dictionary (the instruction set) and can be of various kinds: arithmetic or logic operations, conditional jumps or not, subprogram calls, etc.

In this phase of classical abstract interpretation, the decoder is therefore rewritten in the form of a sequence of instructions among which will stand out the operations associated with the bilinear system $(p, \mathbb{G}_1, \mathbb{G}_2, \mathbb{G}_T)$ implemented by the encryption method according to the invention:

operations of multiplication $T=U \cdot U'$ in $\mathbb{G}_1$,
operations of multiplication $S=V \cdot V'$ in $\mathbb{G}_2$,
operations of exponentiation $U=T^a$ in $\mathbb{G}_1$,
operations of exponentiation $V=S^b$ in $\mathbb{G}_2$,
operations of bilinear coupling $\alpha = \langle U,V \rangle$ (called pairing) of $\mathbb{G}_1 \times \mathbb{G}_2 \to \mathbb{G}_T$,
operations of multiplication $\gamma = \alpha \cdot \beta$ in $\mathbb{G}_T$,
operations of exponentiation $\beta = \alpha^c$ in $\mathbb{G}_T$.

These operations are called algebraic while all others will be classified as related operations. In this same phase of interpretation, the input and output variables of each, instruction are written in a way know as SSA (Static Single Assignment) so that the computation graph of any variable manipulated, by him during his formal execution can easily be deducted from this representation of the pirate decoder. The input variables of the instructions can only be of the following four types:
1. a. constant variable belonging to the starting program,
2. an intermediate variable,
3. an input variable of the program representing a portion of the ciphertext, or
4. a random variable resulting from a call, to a random source external to the decoder program.

The output variable or the program, represents the data, k and comes from a computation graph of output value in $\mathbb{G}_T$.

In a second step known as specialization, the rewritten program is modified to make it suitable for the subsequent identification of traitors. By rewriting the program, all instructions that do not participate in the computation graph of the output variable k (instructions not related to the graph) can be removed from it. It is then necessary to try to set all the input variables of the program (those of types 3 and 4) at constant values that the program is able to decrypt correctly.

This search for constant values may be conducted randomly and exhaustively and, if the decoder originally given is functional enough (that is to say decrypts in a significant fraction of cases on average), this search step will quickly be completed after a few tries.

When the values are suitable, they are substituted for the corresponding variables in the program, so that said program will always run the same way. Thus, an example of successful implementation is instantiated by the new program composed only of instructions performed on constants.

The tracing process now includes a step to simplify the program by obtaining a single sequence of instructions without jump:
a propagation of constants is performed to remove all secondary instructions whose input variables are all constants; this transformation excludes therefore the algebraic operations.

instructions whose execution is tautological are eliminated:
conditional jumps are either eliminated or replaced by unconditional jumps;
function calls are replaced by a copy of the body of the called function;
unnecessary instructions or dead codes are eliminated.

At the end of this step, unconditional jumps are deleted by juxtaposing sequences of linear instructions end to end in chronological order of execution. The program then becomes a series of sequential algebraic instructions without control flow.

At this point, several transformations are applied in an inductive and concurrent manner to the program obtained. To this end, the following is introduced:
a formal instruction $expo_i(u,a)$ that represents the calculation of $u^a$ in $\mathbb{G}_i$ with $i \in \{1,2,T\}$;
a formal instruction of extended "pairing" $\langle U,V; a \rangle$ which represents the calculation of $\langle U,V \rangle^a$.

The following algebraic simplifications are then executed, in an inductive and concurrent manner, until the program is stabilized:
each exponentiation instruction $u^a$ is replaced by $expo_i(u, a)$ for the appropriate $i \in \{1,2,T\}$;
each variable u is replaced by $expo_i(u,1)$ for the appropriate $i \in \{1,2,T\}$;
each combination of instructions of the type $expo_i(u \cdot v, a)$ is replaced by $expo_i(u,a) \cdot expo_i(v,a)$;
each combination of instructions of the type $expo_i(u,a) \cdot expo_i(u,b)$ is replaced by $expo_i(u, a+b \bmod p)$;
each combination of instructions of the type $expo_i(expo_i(u,a),b)$ is replaced by $expo_i(u, ab \bmod p)$;
each "pairing" instruction $\langle U,V \rangle$ is replaced by $\rangle U,V;1 \rangle$;
each combination of instructions of the type $\rangle U \cdot U', V; a \rangle$ is replaced by $\langle U,V;a \langle \cdot \rangle U',V;a \langle$;
each combination of instructions of type $\langle U, V \cdot V'; a \rangle$ is replaced by $\langle U,V;a \rangle \cdot \langle U,V';a \rangle$;
each combination of instructions of type $\langle expo_1(U,a), V; b \rangle$ is replaced by $\langle U,V; ab \bmod p \rangle$;
each combination of instructions of type $\langle U, expo_2(V,a); b \rangle$ is replaced by $\langle U,V; ab \bmod p \rangle$;
each combination of instructions of type $\langle U,V;a \rangle \cdot \langle U,V;b \rangle$ is replaced by $\langle U,V; a+b \bmod p \rangle$;
each combination of instructions of type $expo_T(\langle U,V;a \rangle, b)$ is replaced by $\langle U,V; ab \bmod p \rangle$;
$expo_i(u,0)$ is replaced by 1, $\langle U,V;0 \rangle$ by 1 and $1 \cdot u$ by u.

At the end of this simplification step, the calculation of $k \in \mathbb{G}_T$ can therefore be represented as the result of a product $k=k_1 \cdot k_2$ where:
$k_1$ is a product of n extended "pairings" whose inputs $(U_i, V_i, a_i)$ for $i=1, \ldots, n$ consist of two points $U_i$ and $V_i$ and an integer $a_i$ modulo p such as $(U_i, V_i) \neq (U_j, V_j)$ for $i \neq j$. The variables $U_i$, $V_i$ and $a_i$ are constant values due to the specialization step. Each variable $U_i$, $V_i$ is necessarily either a constant stored in the program, or an input variable which is part of the ciphertext given at the beginning;
$k_2$ is a product of m elements of $\mathbb{G}_T$ i.e. $k_2 = expo_T(\alpha_1, b_1) \ldots expo_T(\alpha_m, b_m)$ where $\alpha_i \neq \alpha_j$ for $1 \leq i \neq j \leq m$. Each variable $\alpha_i$ is necessarily either a constant stored in the program, or a portion of the ciphertext.

In a third step, the coefficient corresponding to each algebraic element of ciphertext c given at the beginning is identified.

More specifically, if the ciphertext given at the beginning contains $u_1, \ldots, u_{r_1} \in \mathbb{G}_1$, $v_1, \ldots, v_{r_2} \in \mathbb{G}_2$ and $w_1, \ldots, w_{r_T} \in \mathbb{G}_T$, for any $v_{i,j} \in [1,r_2]$, all the values $a_i$ such as $v_j = V_i$ are collected and $U_i \notin \{u_1, \ldots, u_{r_1}\}$ is not an element of the ciphertext; a vector $$coef(v_j) = \left(a_{i_1}, \ldots, a_{i_{d_j}}\right)$$

is thereby formed;

for any $v_{i,j} \in [1,r_2]$, the values $a_i$ such as $v_j = V_i$ are collected and $U_i \notin \{u_1, \ldots, u_{r_1}\}$ is not an element of the ciphertext; a vector $$coef(v_j) = \left(a_{i_1}, \ldots, a_{i_{d_j}}\right)$$

is thereby formed;

for any $w_{i,j} \in [1,r_T]$, $coef(w_j) = b_i$ such as $w_j = \alpha_i$ is collected;

For each pair $(u_l, v_l)$, $(l,j) \in [1,r_1] \times [1,r_1]$, $coef(u_l, v_j) = a_i$ where $(u_l, v_l) = (U_i, V_i)$ is collected.

In each of these identification steps, the coefficient is set to 0 by default when a corresponding index i cannot be found.

We now focus on the values of $\{coef(u_i), coef(v_j), coef(w_\epsilon), coef(u_i, v_j)\}$. The mathematical properties of the invention ensure that these values are functions known in advance involving elements $x_1, \ldots, x_\epsilon \in \mathbb{Z}_p$ composing the compromised keys and fixed parameters $s_1, \ldots, s_l \in \mathbb{Z}_p$ composing the ciphertext c given at the beginning.

This forms a system of multivariate equations:

$$coef(u_1) = f_1(x_1, \ldots, x_\epsilon, s_1, \ldots, s_l)$$
$$coef(u_2) = f_2(x_1, \ldots, x_\epsilon, s_1, \ldots, s_l)$$
$$\vdots$$
$$coef(u_{r_1}) = f_{r_1}(x_1, \ldots, x_\epsilon, s_1, \ldots, s_l)$$
$$coef(v_1) = g_1(x_1, \ldots, x_\epsilon, s_1, \ldots, s_l)$$
$$coef(v_2) = g_2(x_1, \ldots, x_\epsilon, s_1, \ldots, s_l)$$
$$\vdots$$
$$coef(v_{r_2}) = g_{r_2}(x_1, \ldots, x_\epsilon, s_1, \ldots, s_l)$$
$$coef(w_1) = h_1(x_1, \ldots, x_\epsilon, s_1, \ldots, s_l)$$
$$coef(w_2) = h_2(x_1, \ldots, x_\epsilon, s_1, \ldots, s_l)$$
$$\vdots$$
$$coef(w_{r_T}) = h_{r_T}(x_1, \ldots, x_\epsilon, s_1, \ldots, s_l)$$
$$coef(u_1, v_1) = q_{1,1}(x_1, \ldots, x_\epsilon, s_1, \ldots, s_l)$$
$$\vdots$$
$$coef(u_{r_1}, v_{r_2}) = q_{r_1, r_2}(x_1, \ldots, x_\epsilon, s_1, \ldots, s_l)$$

Knowing the numerical values of these coefficients, the fixed parameters $s_j$ and functions $f_i$, $g_j$, $h_\epsilon$, $q_{a,b}$, the system can be reversed to retrieve at least one of the elements $x_1, \ldots, x_\epsilon$ composing one of the compromised keys and thus fully identify this key. This step may require having $\epsilon \leq B(r_1, r_2, r_T)$ where $B(r_1, r_2, r_T)$ is a terminal which depends on the embodiment of the invention. Functions $f_i$, $g_j$, $h_\epsilon$, $q_{a,b}$ also depend on the embodiment of the invention.

As an example, if we are operating in the context of the second embodiment described above, any decryption program shows the vector $x^{(i)}$ of one (or more) user(s) i in a masked or unmasked form. The tracer has therefore access to $x^{(i)}$ which were distributed to one or more users, who are therefore identified as traitors.

The invention also provides that a processing entity can be revoked if, for example, it has been, identified as a traitor or for any other reason, and thus prevent said entity from generating a valid control word to allow, for example, the decoding of an encoded content.

The invention provides that two types of revocations can be implemented: a temporary or a permanent revocation.

A temporary revocation results in one or more treacherous entities being temporarily unable to generate more valid control words. A permanent revocation inhibits such generating.

To illustrate this variant, and as an example, we are going to describe the adaptations made to a secure method consistent with the invention and based, on the second embodiment.

Similar adaptations could be made as well to other methods consistent with the invention.

To implement a permanent revocation, the invention provides two additional steps to the methods described above. The first step is to generate revocation data $D\mathfrak{R}$ that are transmitted to all of the processing entities. These data are used to define the exclusion of a set $\mathfrak{R}$ of one or more treacherous entities. The second additional step is to update the decryption key $DK_i$ of the entities which do not belong to $\mathfrak{R}$ so they can continue to generate valid control words.

Let us consider that the treacherous entities are entities $E1$ to $Er$ (or secure subscriber devices $1_1$ to $1_r$). Let us number such entities from 1 to r. The first step to define the revocation data $D\mathfrak{R}$ consists in calculating, according to this example, $D\mathfrak{R} = (R_1, \ldots, R_r)$ with $$R_1 = h^{\frac{1}{\gamma + x_j^{(1)}}}, R_2 = h^{\frac{1}{(\gamma + x_j^{(1)})(\gamma + x_j^{(2)})}}, \ldots, R_r = h^{\frac{1}{(\gamma + x_j^{(1)}) \ldots (\gamma + x_j^{(r)})}},$$

for a value of $j \in [1, d_x]$, for example, $j=1$. The value of the generator h is then modified to take the value of $$R_r : h \leftarrow R_r = h^{\frac{1}{(\gamma + x_j^{(1)}) \ldots (\gamma + x_j^{(r)})}}.$$

Revocation data $D\mathfrak{R} = (R_1, \ldots, R_r)$ are then distributed to all entities.

The second, additional step consists now in changing the decryption keys $DK_i$ of the entities which do not belong to $\mathfrak{R}$ so that they can continue to generate valid control words. The key $DK_i \mathfrak{R}$, corresponding to the $i^{th}$ user or subscriber, that was generated from $D\mathfrak{R}$, is such that $DK_i \mathfrak{R} = (A_i, B^{(i, \mathfrak{R})})$. The vector $B^{(i, \mathfrak{R})} = (B_1^{(i, \mathfrak{R})}, x_1^{(i)}), (B_2^{(i, \mathfrak{R})}, x_2^{(i)}), \ldots, (B_{d_x}^{(i, \mathfrak{R})}, x_{d_x}^{(i)})$ of the $d_x$ elects is such that $$B_j^{(i,R)} = (B_j^{(i)})^{\overline{\prod_{j=1}^{r}(\gamma + x_w^{(l)})}} = \left(B_j^{(i)} \cdot \prod_{m=1}^{r} R_m^{(-1)^{j+r} \cdot \prod_{n=1}^{m-1}(x_j^{(i)} - x_w^{(n)})}\right)^{\overline{\prod_{j=1}^{r}(\gamma - x_w^{(l)})}}$$

for a value of $w \in [1, d_x]$, for example, $w=1$.

The calculation of the new value $DK_i \mathfrak{R}$ be implemented by each processing entity in accordance with the invention.

This calculation can alternatively be carried out by a third entity. Any other procedure to update said key can also be used.

The invention provides as an alternative that revocation data can be transmitted, to processing entities in conjunction with encrypted control words. Thus, it is not necessary to transmit said data in a dedicated mode. These can, for example, be an integral part of the ciphertext such that $c=(W_1,W_2,s,U,D\Re)$ according to the second embodiment of a method provided by the invention for transmitting a control word.

In addition, it may be provided that the modification of the decryption key $DK_i \leftarrow DK_{i,\Re}$ be performed by the processing entity just before the step to generate a control word.

We can see that to implement a permanent revocation, the step performed by the server to generate the key $DK_i$, as well as the one performed by the entities to generate the plaintext of the control word k, are unchanged. The generator h, in turn, is no longer fixed to generate the ciphertext. Indeed, h depends on all the entities revoked. The decryption key is also no longer fixed when generating the plaintext k.

The invention further provides to adapt a method consistent with the invention, to implement a temporary revocation. As before, let us use the example of the second embodiment of a method according to the invention to illustrate this feature. Similarly, let us consider that the treacherous entities are entities E1 to Er (or the secure subscriber devices $\mathbf{1}_1$ à $\mathbf{1}_r$) numbered from 1 to r.

A first additional step consists—just as for the permanent revocation—in calculating revocation data $D\Re$ such that $D\Re = (R_1, \ldots, R_r)$ with $$R_1 = h^{\frac{1}{\gamma+x_j^{(1)}}}, R_2 = h^{\frac{1}{(\gamma+x_j^{(1)})(\gamma+x_j^{(2)})}}, \ldots, R_r = h^{\frac{1}{(\gamma+x_j^{(1)}) \cdots (\gamma+x_j^{(r)})}}$$

for a value of $j \in [1,d_x]$, for example, j=1. The value of the generator h is then modified to take the value of $$R_r: h \leftarrow R_r = h^{\frac{1}{(\gamma+x_j^{(1)}) \cdots (\gamma+x_j^{(r)})}}.$$

The server produces the encrypted control word as a result of components such that $c=(W_1,W_2,s,U,D\Re,x_j^{(1)}, \ldots, x_j^{(r)})$. The first four components $W_1$, $W_2$, s and U are typically generated (with the difference that h is modified in advance) such that $h \leftarrow R_r$. $U=(U_1, \ldots, U_{d_s})$ is a vector of the $d_s$ values such that $$U_1 = h^{\frac{1}{\gamma+s_1}}, U_2 = h^{\frac{1}{(\gamma+s_1)(\gamma+s_2)}}, \ldots, U_{d_s} = h^{\frac{1}{(\gamma+s_1) \cdots (\gamma+s_{d_s})}},$$

$$W_1 = (g^\gamma)^m, W_2 = h^{\frac{m}{(\gamma+s_1) \cdots (\gamma+s_{d_s})}} = U_{d_s}^m,$$

m being an integer. The ciphertext also includes $D\Re$ and $x_j^{(1)}, \ldots, x_j^{(r)}$ for the chosen value of j.

Upon receiving an encrypted control word c, a processing entity Ei implements a step to generate the plaintext of said control word.

This step is adapted to calculate k such that $$k = e\left(g^\gamma, \prod_{j=1}^{d_x} (B_j^{(i,R)})^{\overline{\prod_{l=1}^{d_s}(\gamma+s_l)}}\right) \cdot e(A_i, W_2)$$

where $\prod_{j=1}^{d_x} (B_j^{(i,R)})^{\overline{\prod_{l=1}^{d_s}(\gamma+s_l)}} =$ $$\prod_{j=1}^{d_x}\left(B_j^{(i)} \cdot \prod_{y=1}^{r} U_y^{(-1)^{j+r} \cdot \prod_{n=1}^{y-1}(x_j^{(i)}-s_n)}\right)^{\overline{\prod_{l=1}^{r}(x_j^{(i)}-s_l)}}.$$

We can see that to implement a temporary revocation, the step to generate key $DK_i$ remains unchanged. The generator h is no longer fixed because it depends on all the revoked entities. The step to generate a ciphertext is simply preceeded by the assignment of said generator before generating a ciphertext. The production of the plaintext of the control word k is adapted to implement the temporary revocation.

The invention has been described in connection with the field of conditional access to protected content as an example of preferred application. The invention could be applied to other fields where it is necessary to transmit to a plurality of processing entities a ciphertext whose plaintext is used, by such entities.

The invention claimed is:

1. A method for conditional access to digital content comprising:
   encoding, by a broadcast server of protected digital content, a digital content M and generating, by the broadcast server, an encoded content C using an encoding function implemented by the broadcast server;
   generating, by said broadcast server of protected digital contents, an encrypted control word c whose plaintext k is intended for use by a plurality of subscriber processing entities for decoding said encoded content C;
   transmitting, by said broadcast server, said encoded content C and encrypted control word c for subscriber entities through a distribution network connected to said broadcast server;
   receiving, by each subscriber processing entity, said encoded content C and encrypted control word c;
   generating the plaintext k of the encrypted control word c, by each subscriber processing entity, from the encrypted control word c;
   decoding, by each subscriber processing entity, the encoded content C and generating a content M from a decoding function and k;
   retrieving said content M using an interface adapted to said content;
   wherein:
   the broadcast server generates the encrypted control word c from:
   i. a vector s of $d_s$ elements each belonging to a set $\mathbb{Z}^*_p$ of random non-zero integers modulo p, p being a prime number, $d_s$ being an integer strictly greater than 1 and small compared to a number of subscriber processing entities;
   ii. a secret value γ known to the broadcaster server and belonging to the set $\mathbb{Z}^*_p$ of non-zero integers modulo p;

iii. two generators belonging respectively to two cyclic groups $\mathbb{G}_1$ and $\mathbb{G}_2$ of order p, parameters of a bilinear group $\beta=(p,\mathbb{G}_1,\mathbb{G}_2,\mathbb{G}_T,e(.,.))$ of order p where e(.,.) is a coupling such that e: $\mathbb{G}_1 \times \mathbb{G}_2 \to \mathbb{G}_T$, $\mathbb{G}_T$ being a third cyclic group of order p; and each subscriber processing entity generates a control word k from:
  i. the encrypted control word c;
  ii. a decryption key $DK_i$ known to an $i^{th}$ entity and previously generated from:
    a) a vector $x^{(i)}$ of $d_x$ elements each belonging to the set $\mathbb{Z}^*_p$ of random non-zero integers modulo p, $d_x$ being an integer strictly greater than 1 and small compared to the number of processing entities, the vector $x^{(i)}$ being dedicated to the $i^{th}$ entity;
    b) the secret value $\gamma$;
    c) a generator belonging to one of the cyclic groups of the bilinear group $\beta$.

2. The method according to claim 1, each processing entity comprising a terminal in association with a secure subscriber device implementing respectively the decoding of an encoded content and the generating of the plaintext of an encrypted control word, wherein:

receiving an encoded content C and an encrypted control word c by a processing entity comprises:
  i. receiving the encoded content and encrypted control word by the terminal;
  ii. transmitting the encrypted control word c by the terminal to the secure subscriber device cooperating with said terminal;

generating the plaintext of a control word k in a processing entity comprises generating the plaintext by the secure subscriber device which delivers it to the terminal;

decoding an encoded content C comprises implementing by the terminal the decoding function for generating a content M from the encoded content C and from said control word k.

* * * * *